United States Patent

Chang

[19]

[11] Patent Number: 5,813,317
[45] Date of Patent: Sep. 29, 1998

[54] BREWING POT

[76] Inventor: Keng-Hao Chang, 7th Fl.-1, No. 806, Sec. 1, Meitsun Rd., Taichung, Taiwan

[21] Appl. No.: 990,477

[22] Filed: Dec. 15, 1997

[51] Int. Cl.$^6$ .............................. A47J 31/00; A47J 31/06; A47J 31/10; A47J 31/40

[52] U.S. Cl. ............................ 99/285; 99/289 R; 99/295; 99/299; 99/300; 99/305; 99/312; 99/323; 210/238; 210/419; 210/430; 210/474

[58] Field of Search .................................... 099/495, 285, 099/289 R, 290, 291, 295, 299, 300, 304–306, 310–315, 312, 316, 317, 323, 323.3; 141/87; 210/238, 419, 430, 431, 474, 476, 482, 497.3; 426/77–82, 241, 433, 435

[56] References Cited

U.S. PATENT DOCUMENTS

| | | | |
|---|---|---|---|
| 933,917 | 9/1909 | Norwood | 99/323 |
| 1,665,143 | 4/1928 | McMillan | 99/299 |
| 2,187,029 | 1/1940 | Hevers | 99/279 |
| 3,566,770 | 3/1971 | Crossley | 99/289 R |
| 4,266,471 | 5/1981 | Rosengren | 99/305 |
| 4,354,427 | 10/1982 | Fillipowicz et al. | 99/307 X |
| 4,426,920 | 1/1984 | Phillips et al. | 99/307 |
| 4,527,467 | 7/1985 | Siemensma | 99/279 |
| 4,653,390 | 3/1987 | Hayes | 99/281 X |
| 4,771,680 | 9/1988 | Snowball et al. | 99/295 |
| 5,632,193 | 5/1997 | Shen | 99/285 |
| 5,632,194 | 5/1997 | Lin | 99/285 |
| 5,725,765 | 3/1998 | Shen | 210/238 |

*Primary Examiner*—Timothy F. Simone
*Attorney, Agent, or Firm*—Kolisch Hartwell Dickinson McCormack & Heuser

[57] ABSTRACT

A brewing pot for tea includes a container including an upper portion having a top rim defining at least one cavity, and a lower portion defining a chamber, and an abutting edge formed between the upper portion and the lower portion. A supporting base supported on the abutting edge includes an upright post. A cylindrical body is slidably mounted on the supporting base and includes a top portion formed with an annular flange and a bottom portion defining a socket. At least one block is formed on the annular flange and abuts on the top rim of the container, and a control ball is received in the socket. The cylindrical body and the supporting base can be rotated relative to the container to a position where the block is received in the cavity such that the body can be moved downward relative to the supporting base while the control ball can be moved toward the post such that the control ball can be urged by the post to rise from the socket.

7 Claims, 5 Drawing Sheets

BREWING POT

FIELD OF THE INVENTION

The present invention relates to a brewing pot.

BACKGROUND OF THE INVENTION

A conventional especially a brewing pot for tea, comprises a cup with an open top portion, and a funnel-shaped filtering base received in the cup for receiving tea-leaves therein. The filtering base includes an open top rim formed with an annular flange abutting on the open top portion of the cup and defines a plurality of holes each communicating with a chamber defined in the cup.

In operation, hot water can be initially poured into the cup to reach a determined of level therein. The filtering base containing tea-leaves therein can then be immersed into the cup such that the tea-leaves can be mixed with hot water in the cup, and can be removed from the cup after a period of time during which the tea has brewed, thereby making tea for a user's drinking. The above-mentioned procedures can be repeated until the flavor of the tea-leaves be comes too weak.

By such an arrangement, however, it is necessary to take the filtering base away from the cup repeatedly so that the user may drinking the brewed tea, thereby greatly causing an inconvenience when being in use.

The present invention has arisen to mitigate and/or obviate the disadvantage of the conventional teapot.

SUMMARY OF THE INVENTION

In accordance with one aspect of the present invention, there is provided a brewing pot comprising a container including an upper portion having an open top rim defining at least one cavity therein, and a lower portion having a dimension smaller than that of the upper portion and defining a chamber therein, and an abutting edge formed between the upper portion and the lower portion.

A supporting base is received in the upper portion of the container and includes an outer wall formed with an annular shoulder supported on the abutting edge, and an upright post formed on a central portion of the supporting base.

A cylindrical body is rotatably received in the upper portion of the container and is slidably mounted on the outer wall of the supporting base. The cylindrical body includes a top portion formed with an annular flange located above the top rim of the container, and a bottom portion defining a socket located above the upright post.

At least one block is formed on an underside of the annular flange to rotate therewith and abuts on the top rim of the container. A control ball is detachably received in the socket.

By such an arrangement, the cylindrical body together with the supporting base can be rotated relative to the container to a position where the block can be received in the cavity such that the cylindrical body can be moved downward relative to the supporting base while the control ball can be moved toward the post such that the control ball can be urged by the post to rise from the socket.

Further features of the present invention will become apparent from a careful reading of the detailed description with appropriate reference to the accompanying drawings.

DETAILED DESCRIPTION OF THE PREFERRED EMBODIMENTS

Figure 1:
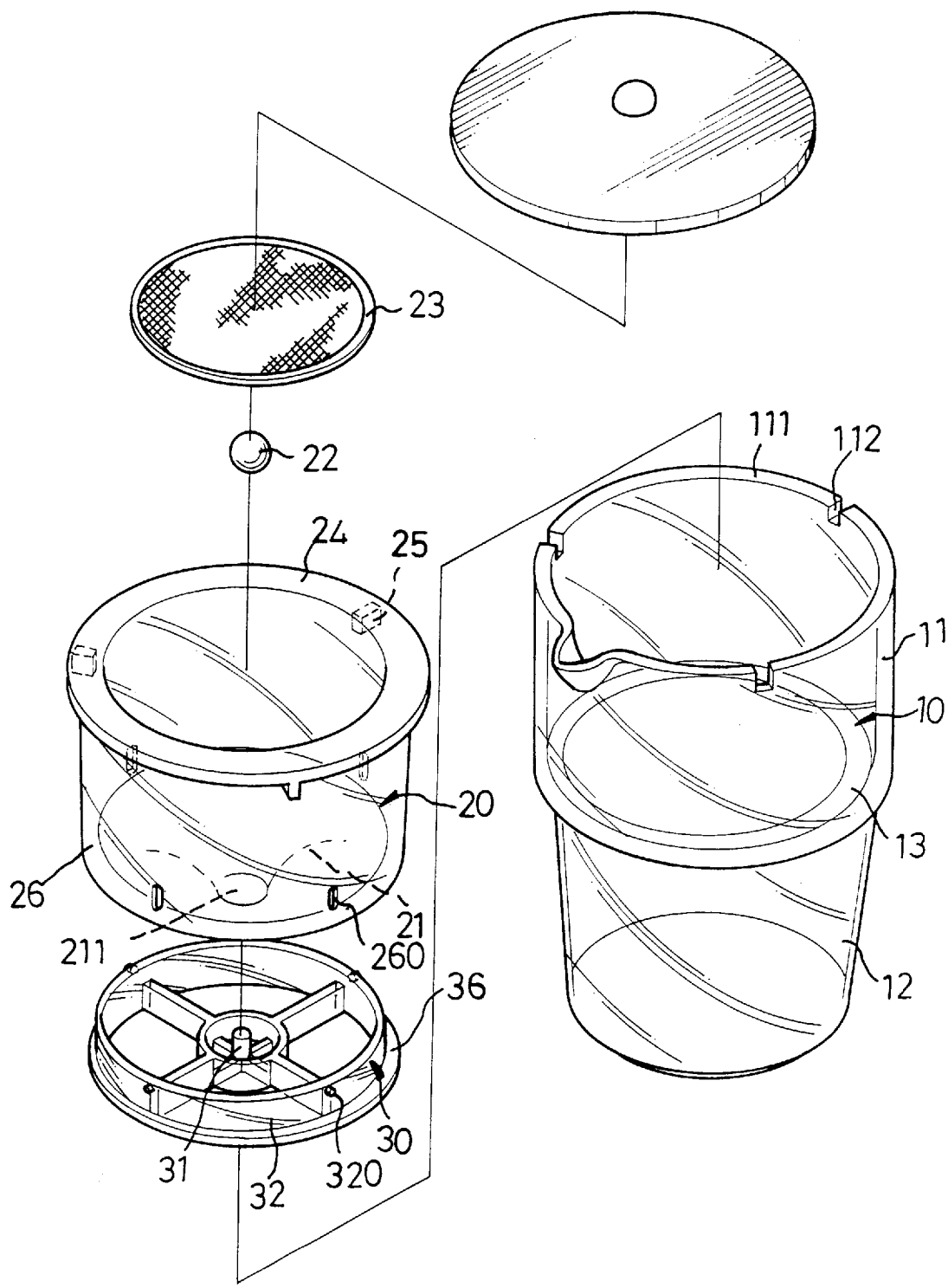
FIG. 1 is an exploded view of a brewing pot in accordance with a first embodiment of the present invention.
Figure 2:
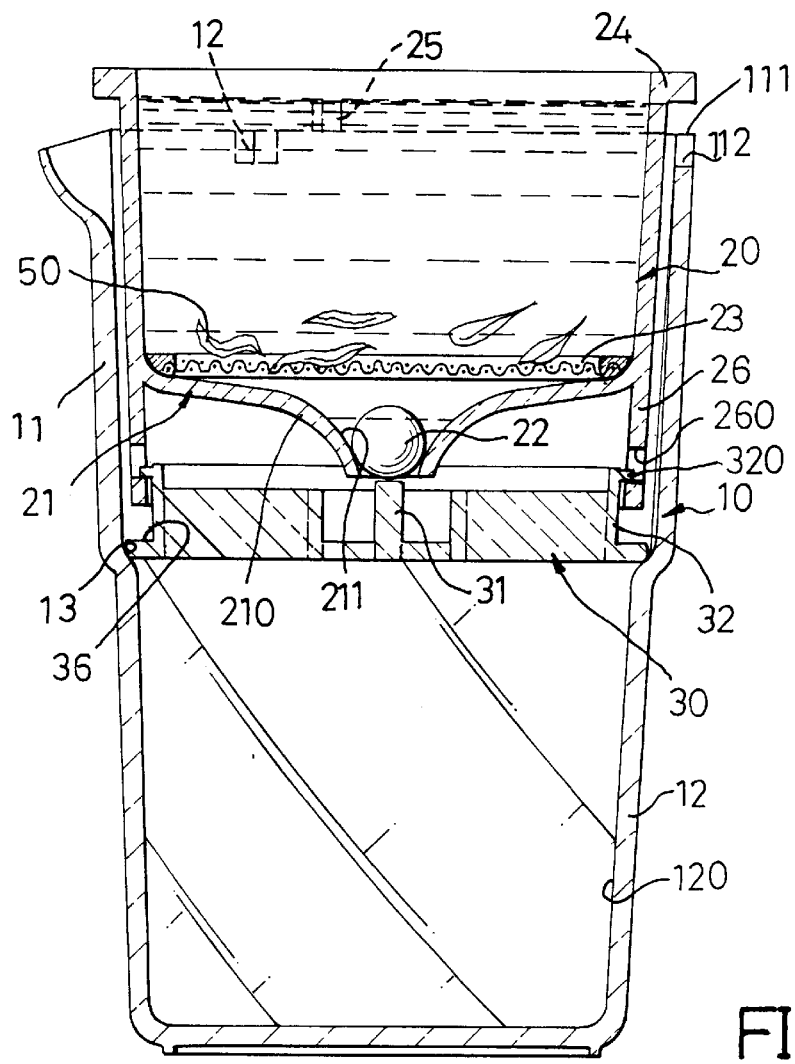
FIG. 2 is a front plan cross-sectional assembly view of the brewing pot as shown in FIG. 1.
Figure 3:
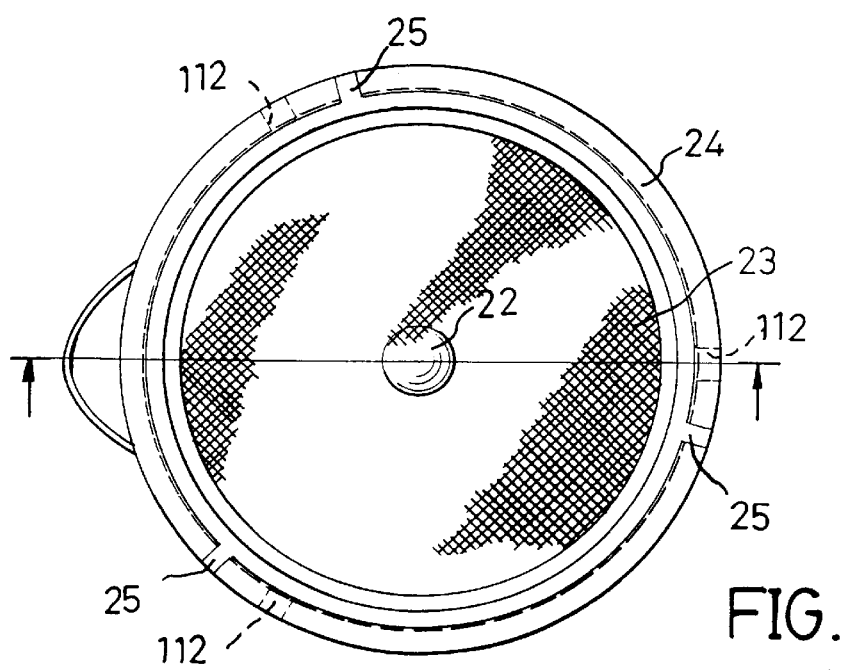
FIG. 3 is a top plan view of FIG. 2.

Referring to the drawings, and initially to FIGS. 1 and 2, a brewing pot according to a first embodiment of the present invention comprises a container 10 including an upper portion 11 having an open top rim 111 defining a plurality of cavities 112 therein, and a lower portion 12 having a dimension smaller than that of the upper portion 11 and defining a chamber 120 therein, and an abutting edge 13 formed between the upper portion 11 and the lower portion 12.

A supporting base 30 received in the upper portion 11 of the container 10 includes an outer wall 32 formed with an annular shoulder 36 supported on the abutting edge 13, and an upright post 31 formed on a central portion thereof.

A cylindrical body 20 is rotatably received in the upper portion 11 of the container 10 and is slidably mounted over the outer wall 32 of the supporting base 30.

The cylindrical body 20 includes a top portion formed with an annular flange 24 which can be located above the top rim 111 of the container 10, and a bottom portion 21 including a cone-shaped central portion 210 extending downward and defining a socket 211 to be located above the upright post 31.

A control ball 22 is detachably received in the socket 211. A filtering mesh 23 is received in the cylindrical body 20 and is supported on the bottom portion 21 thereof.

A plurality of blocks 25 are formed on an underside of the annular flange 24 and each abut on the top rim 111 of the container 10.

The cylindrical body 20 includes an annular lower portion 26 extending downward from the bottom portion 21 thereof. A plurality of elongate slots 260 are defined in the annular lower portion 26 and are vertically disposed.

A plurality of lugs 320 are formed on the outer wall 32 of the supporting base 30 and are each slidably received in a corresponding one of the elongate slots 260 such that the cylindrical body 20 can be moved relative to the supporting base 30.

In operation, referring to FIGS. 1–4, the control ball 22 is initially received in the socket 211 as shown in FIG. 2, thereby sealing the bottom portion 21 of the cylindrical body 20 such that hot water can be in turn poured into the cylindrical body 20 for mixing with tea-leaves 50 contained therein, whereby a drink of tea can brew for a user.

Figure 4:
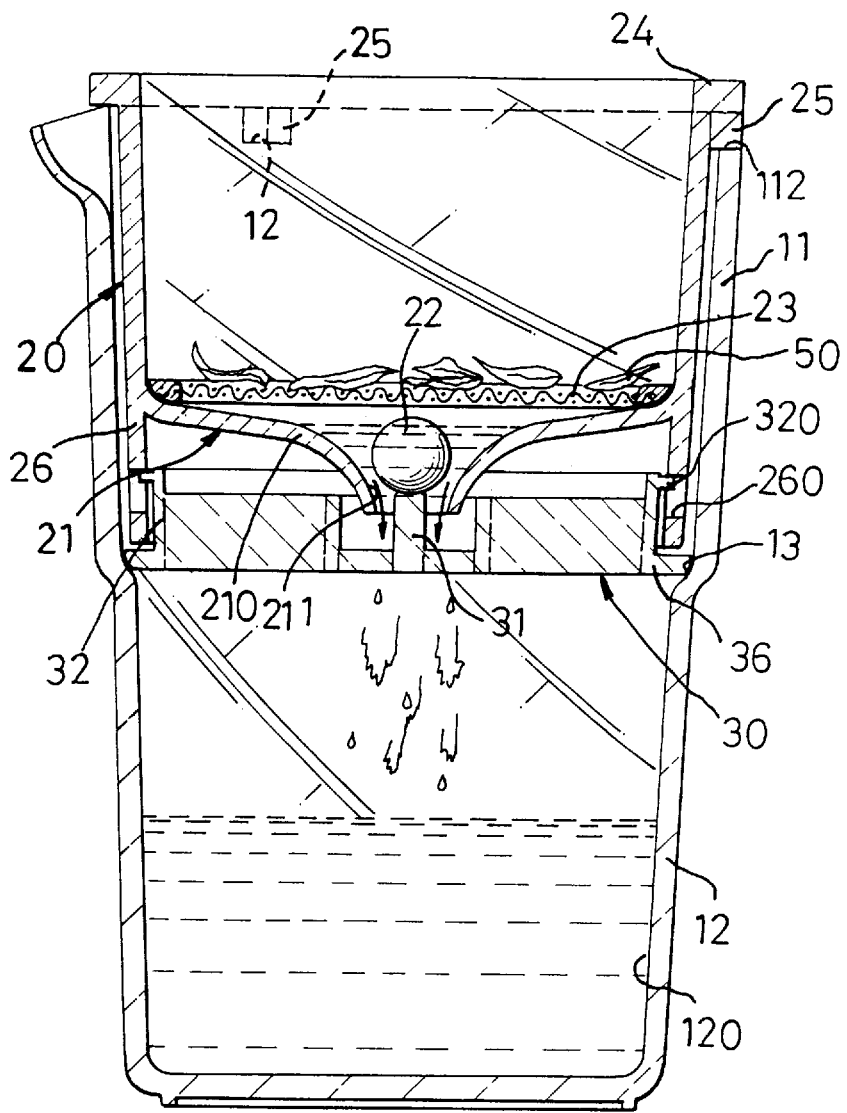
FIG. 4 is an operational view of FIG. 2.

The cylindrical body 20 together with the supporting base 30 can then be rotated relative to the container 10 to a position where each of the blocks 25 can be respectively received in a corresponding one of the cavities 112 while the annular flange 24 abuts on the top rim 111 such that the cylindrical body 20 can be moved downward relative to the supporting base 30 while the control ball 22 can be moved toward the post 31 such that the control ball 22 can be urged by the post 31 to rise from the socket 211 as shown in FIG. 4, thereby allowing the drink of tea to flow from the cylindrical body 20 into the chamber 120 via the supporting base 30 for the user's consumption.

Figure 5:
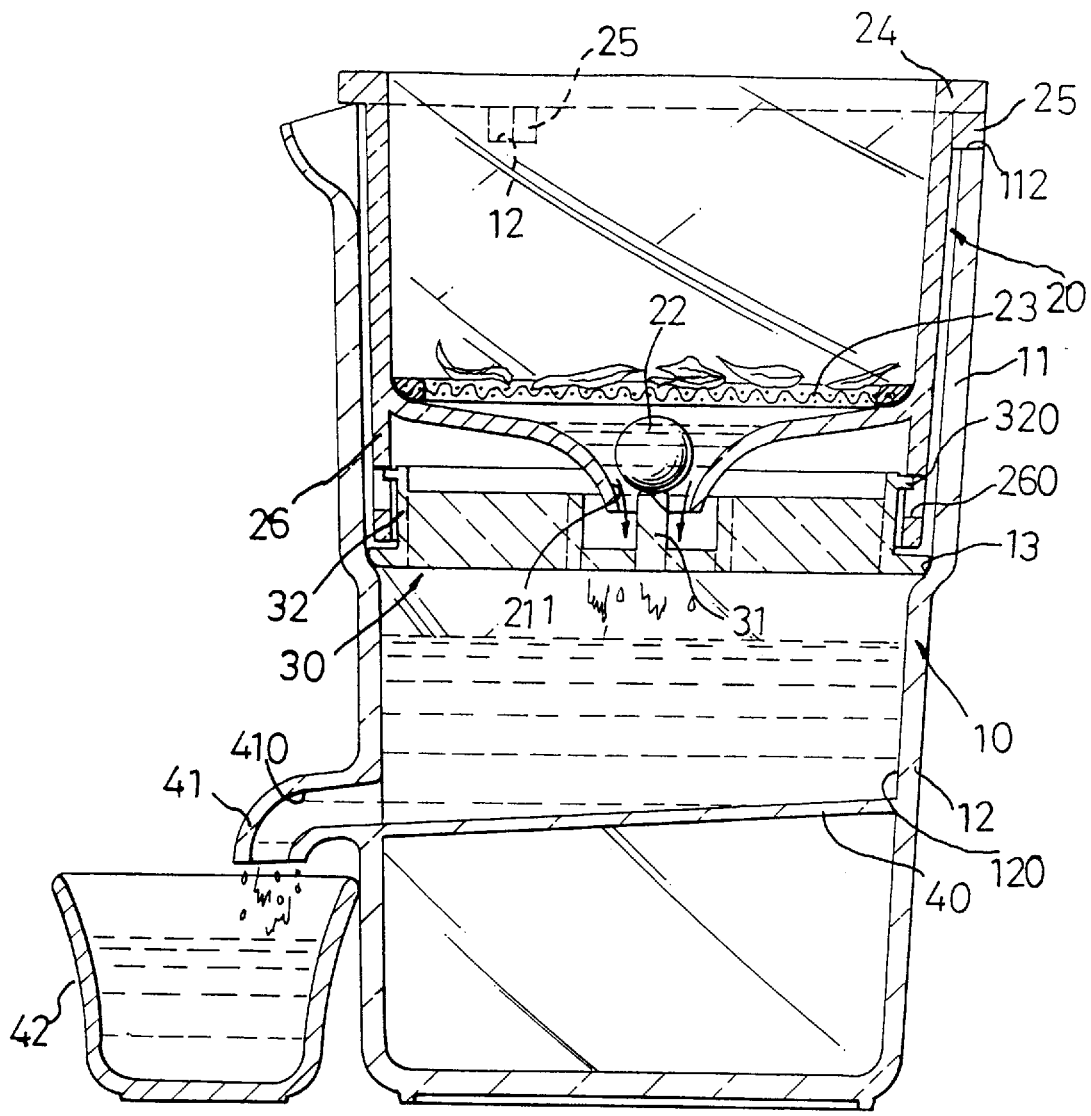
FIG. 5 is a front plan cross-sectional assembly view of a brewing pot in accordance with a second embodiment of the present invention.

Referring to FIG. 5, according to a second embodiment of the present invention, an outlet mouth 41 extends outward from an outer periphery of the lower portion 12 of the container 10 and defines a nozzle 410 communicating with the chamber 120. A baffle 40 is fixedly mounted in the chamber 120 in an inclined manner and includes a lower portion juxtaposed to the outlet mouth 41.

By such an arrangement, the drink of tea received in the chamber 120 can be poured into a cup 42 via the nozzle 410 of the outlet mouth 41.

Figure 6:
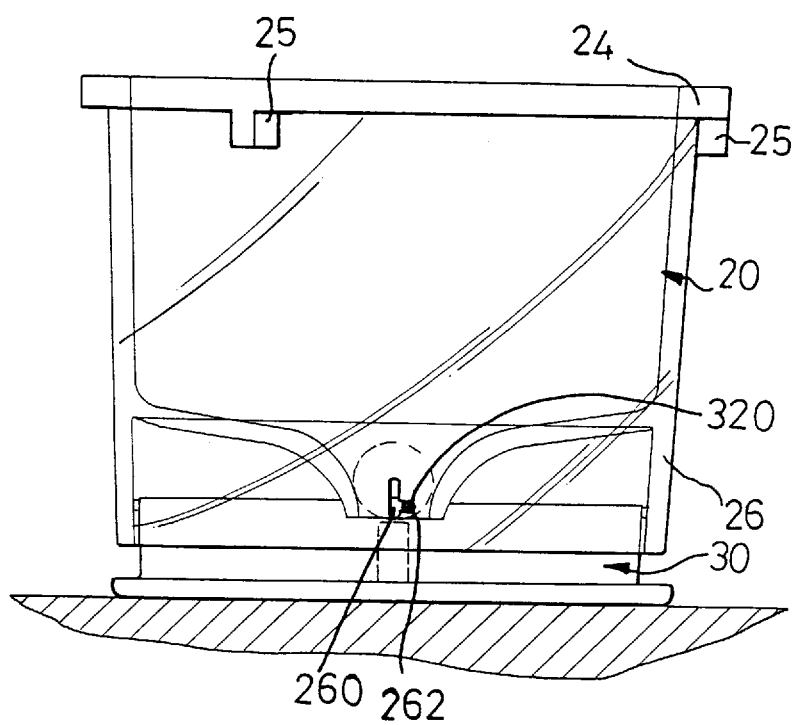
FIG. 6 is a partially cut-away side cross-sectional assembly view of a brewing pot in accordance with a third embodiment of the present invention.

Referring to FIG. 6 with reference to FIG. 1, according to a third embodiment of the present invention, the annular lower portion 26 of the cylindrical body 20 defines a plurality of lateral openings 262 horizontally disposed each communicating with a corresponding one of the elongate slots 260 for receiving an associated lug 320, thereby securing the cylindrical body 20 on the supporting base 30.

It should be clear to those skilled in the art that further embodiments may be made without departing from the scope and spirit of the present invention.

What is claimed is:

1. A brewing pot comprising:

a container (10) including an upper portion (11) having an open top rim (111) defining at least one cavity (112) therein, and a lower portion (12) having a dimension smaller than that of said upper portion (11) and defining a chamber (120) therein, and an abutting edge (13) formed between said upper portion (11) and said lower portion (12);

a supporting base (30) received in said upper portion (11) of said container (10) and including an outer wall (32) formed with an annular shoulder (36) supported on said abutting edge (13), and an upright post (31) formed on a central portion of said supporting base (30); and a cylindrical body (20) rotatably received in said upper portion (11) of said container (10) and slidably mounted over said outer wall (32) of said supporting base (30), said cylindrical body (20) including a top portion formed with an annular flange (24) located above said top rim (111) of said container (10), and a bottom portion (21) defining a socket (211) located above said upright post (31), at least one block (25) formed on an underside of said annular flange (24) to rotate therewith and abutting on said top rim (111) of said container (10), and a control ball (22) detachably received in said socket (211);

wherein, said cylindrical body (20) together with said supporting base (30) can be rotated relative to said container (10) to a position where said block (25) can be received in said cavity (112) such that said cylindrical body (20) can be moved downward relative to said supporting base (30) while said control ball (22) can be moved toward said post (31) such that said control ball (22) can be urged by said post (31) to detach from said socket (211).

2. The brewing pot in accordance with claim 1, wherein said cylindrical body (20) includes an annular lower portion (26) extending downward from said bottom portion (21) thereof, a plurality of elongate slots (260) are defined in said annular lower portion (26), and a plurality of lugs (320) are formed on said outer wall (32) of said supporting base (30) and are each slidably received in a corresponding one of said elongate slots (260).

3. The brewing pot in accordance with claim 2, wherein said annular lower portion (26) of said cylindrical body (20) defines a plurality of openings (262) horizontally disposed each communicating with a corresponding one of said elongate slots (260) for receiving an associated said lug (320).

4. The brewing pot in accordance with claim 1, wherein said bottom portion (21) of said cylindrical body (20) includes a cone-shaped central portion (210) defining said socket (211) and extending downward.

5. The brewing pot in accordance with claim 1, further comprising a filtering mesh (23) received in said cylindrical body (20) and supported on said bottom portion (21) thereof.

6. The brewing pot in accordance with claim 1, further comprising an outlet mouth (41) extending outward from an outer periphery of said lower portion (12) of said container (10) and defining a nozzle (410) communicating with said chamber (120).

7. The brewing pot in accordance with claim 6, further comprising a baffle (40) fixedly mounted in said chamber (120) in an inclined manner and including a lower portion juxtaposed to said outlet mouth.(41).

* * * * *